United States Patent [19]

Harris

[11] Patent Number: 5,568,828

[45] Date of Patent: Oct. 29, 1996

[54] FUEL-DELIVERY CONTROL SYSTEM

[75] Inventor: Robert S. Harris, Connersville, Ind.

[73] Assignee: Stant Manufacturing Inc., Connersville, Ind.

[21] Appl. No.: 346,785

[22] Filed: Nov. 30, 1994

[51] Int. Cl.⁶ .............................. B65B 1/04; B65B 3/00; B67C 3/00

[52] U.S. Cl. .............. 141/348; 141/59; 141/46; 141/325; 141/326; 141/198; 137/514.5; 137/587; 220/86.2

[58] Field of Search .................. 141/59, 67, 44, 141/45, 46, 285, 325, 326, 348, 198; 137/514.5, 543.19, 543.21, 587, 588; 220/86.2

[56] References Cited

U.S. PATENT DOCUMENTS

| | | | |
|---|---|---|---|
| 2,912,001 | 4/1955 | Green | 137/543.19 |
| 2,934,085 | 4/1960 | Mylander | 137/543.19 |
| 3,036,594 | 5/1962 | Salisbury | 137/543.19 |
| 3,866,638 | 2/1975 | Mingus et al. | 141/352 |
| 3,911,977 | 10/1975 | Berger | 141/348 |
| 3,938,564 | 2/1976 | Jones | 141/352 |
| 4,424,839 | 1/1984 | Otani et al. | 141/348 |
| 4,630,749 | 12/1986 | Armstrong et al. | 220/86 R |
| 4,638,832 | 1/1987 | Mokveld | 137/514.5 |
| 4,651,889 | 3/1987 | Uranishi et al. | 220/85 VR |
| 4,702,386 | 10/1987 | Boehmer et al. | 220/86 R |
| 4,714,172 | 12/1987 | Morris | 220/86 R |
| 4,765,504 | 8/1988 | Sherwood et al. | 220/86 R |
| 4,809,863 | 3/1989 | Woodcock et al. | 220/85 F |
| 4,974,645 | 12/1990 | Johnson | 141/59 |
| 4,977,936 | 12/1990 | Thompson et al. | 141/312 |
| 5,056,570 | 10/1991 | Harris et al. | 141/59 |
| 5,271,438 | 12/1993 | Griffin et al. | 220/86.2 |
| 5,277,168 | 1/1994 | Kondo et al. | 123/519 |
| 5,318,069 | 6/1994 | Harris | 137/588 |

Primary Examiner—Henry J. Recla
Assistant Examiner—Timothy L. Maust
Attorney, Agent, or Firm—Barnes & Thornburg

[57] ABSTRACT

A fuel-delivery control system is provided for use in a fuel tank. The fuel-delivery system includes a housing module formed to include a fuel-delivery channel and a check valve assembly positioned to lie in the fuel-delivery channel. The check valve assembly includes a support base formed to include a guide passageway, a mounting fixture inserted into the fuel-delivery channel and arranged to interconnect the housing module and the support base, a valve member, and a spring. The valve includes a guide stem extending into the guide passageway for movement therein and a closure member appended to the guide stem for movement with the guide stem between a channel-closing position engaging the housing module and a channel-opening position disengaging the housing module. The guide stem moves in the guide passageway as the closure member moves between the channel-opening position and channel-closing position. The spring yieldably urges the valve member to its channel-closing position.

30 Claims, 4 Drawing Sheets

FUEL-DELIVERY CONTROL SYSTEM

BACKGROUND AND SUMMARY OF THE INVENTION

This invention relates to a fuel system, and particularly to a fuel-delivery control system. More particularly, this invention relates to a filler neck and a valve assembly for regulating flow of liquid fuel and fuel vapor through a fuel tank filler neck.

A filler neck is a tube which conducts liquid fuel from a fuel-dispensing pump nozzle to an interior fuel storage region in a fuel tank. Although an open passageway through the filler neck into the fuel tank is needed during refueling to conduct liquid fuel from a pump nozzle into the fuel tank, it is desirable to close the filler neck at all other times to block discharge of liquid fuel and fuel vapor from the fuel tank through the filler neck. In many cases, a fuel cap is mounted on an outer end of the filler neck to close the filler neck during the time period before and after each tank refueling activity.

It is also known to use a check valve with a fuel tank inlet neck to close the filler neck under certain circumstances. Typically, such a check valve, where used, has been a swinging trap door or a floating ping-pong ball in a cage. The disadvantage of these systems is that, when located at or below liquid level in the fuel tank, it is difficult to initiate fuel fill into the fuel tank since the existing fuel in the fuel tank must be displaced for the check valve to open.

What is needed is a fuel-delivery control system apart from a cap that can automatically close a passageway through a filler neck under normal conditions and open the filler neck passageway during refueling. Ideally such a system would be designed to maximize the flow rate of liquid fuel into the fuel tank during refueling without creating a lot of unwanted fuel vapor. In addition, such a control system should provide a fast response to close the passageway in the event of a sudden rise in tank pressure, as when the tank achieves a full level. Rapid closure of the passageway prevents flow reversal from the tank which can result in "spitback" or the spray of fuel from the filler neck as the fuel-dispensing pump nozzle shuts off.

According to the present invention, a fuel-delivery control system is provided for regulating flow through a filler neck into a fuel tank. The system includes a housing module formed to include a fuel-delivery channel and a check valve assembly positioned to lie in the fuel-delivery channel.

The check valve assembly includes a support base, a valve member, and a spring. The support base is appended to the housing module. The valve member is coupled to the support base for sliding movement between a channel-closing position engaging the housing module and a channel-opening position disengaging the housing module. The support base and valve member are formed to include a closed interior region therebetween. The spring is positioned to lie in the closed interior region and yieldably urge the valve member toward its channel-closing position.

In preferred embodiments, the support base includes a radially extending mounting fixture appended to an interior wall of the fuel-delivery channel and a conical tail fixed to an axially extending edge of the mounting fixture. The conical tail is arranged to extend along the longitudinal axis of the fuel-delivery channel in spaced-apart relation from the interior wall of the fuel-delivery channel. The support base further includes a cylindrical guide sleeve appended to a circular forward end of the conical tail.

The housing module includes a circular valve seat provided in the fuel-delivery channel. Illustratively, the housing module containing the check valve assembly is mounted adjacent to the fuel tank in an inlet throat tube appended to the fuel tank.

In a first embodiment, the valve member includes a dome-shaped closure member facing toward the circular valve seat and a slidable guide stem extending into the cylindrical guide sleeve included in the support base. Illustratively, the spring is placed in an interior space formed inside the guide sleeve of the support base and the guide stem of the valve member. The spring is a compression spring that normally acts, at all times other than refueling, to exert a biasing force against the dome-shaped closure member so that it sealingly engages the circular valve seat formed in the fuel-delivery channel to block flow of liquid fuel and fuel vapor through the fuel-delivery channel.

In a second embodiment, the valve member includes a base portion, an annular seal member, and a somewhat conical nose portion. When the valve member is moved by the spring to its fuel-delivery closing position, the annular seal member sealingly engages the circular valve seat formed in the housing module.

In a third embodiment, the length of the tail in the support base and the length of the valve member are shortened as compared to other embodiments to produce a smaller, more compact check valve assembly. At the same time, the length of the housing module containing the check valve assembly is also minimized.

A filler neck is used to conduct liquid fuel from a filling station pump nozzle to the fuel tank. An outer end of the filler neck carries a removable fuel cap and an inner end of the filler neck is connected to the housing module so that liquid fuel conducted through the filler neck will pass through the fuel-delivery channel formed in the housing module on its way into the fuel tank. The check valve assembly lies in that fuel-delivery channel and functions to regulate flow of liquid fuel and fuel vapor between the filler neck and the fuel tank.

During refueling, liquid fuel discharged by a pump nozzle into the filler neck operates to move the valve member automatically to its fuel-delivery channel-opening position in the following manner. Liquid fuel passes through the filler neck on its way toward the fuel tank, strikes the component (e.g., either the dome-shaped closure or the conical nose portion and annular seal member) that is in engagement with the circular valve seat provided in the fuel-delivery channel, and urges the valve member in an axially inward direction against its biasing spring and away from the circular valve seat provided in the fuel-delivery channel. This movement creates an annular fluid-conducting space around the dome-shaped closure or conical nose portion so that liquid fuel dispensed by the pump nozzle can pass around the valve member and support member and through the fuel-delivery channel into the fuel tank.

The check valve assembly is designed and configured to control flow of liquid fuel and fuel vapor through the fuel-delivery channel without causing the flow of liquid fuel passing around the movable member and fixed support member to become turbulent when the valve member is moved to its fuel-delivery channel-opening position during refueling. Turbulent liquid fuel flow creates unwanted fuel vapor and also creates unwanted back pressure in the fuel tank that might lead to premature shutoff of the filling station pump nozzle. Advantageously, the flow annulus around the valve member is only slightly larger than the inlet passage of the fuel-delivery channel and the check valve assembly elements are tapered, contoured, and arranged to minimize turbulent flow of liquid fuel during refueling.

In addition, an exhaust passage is provided to discharge air or fuel vapor from interior space receiving the spring and lying between the support base and the valve member to an exit portion of the support member. This exhaust passage functions to exhaust air or fuel vapor from the spring-receiving interior space during rapid opening of the valve and to allow fuel tank pressure to assist the spring in valve closure when tank pressure increases suddenly.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
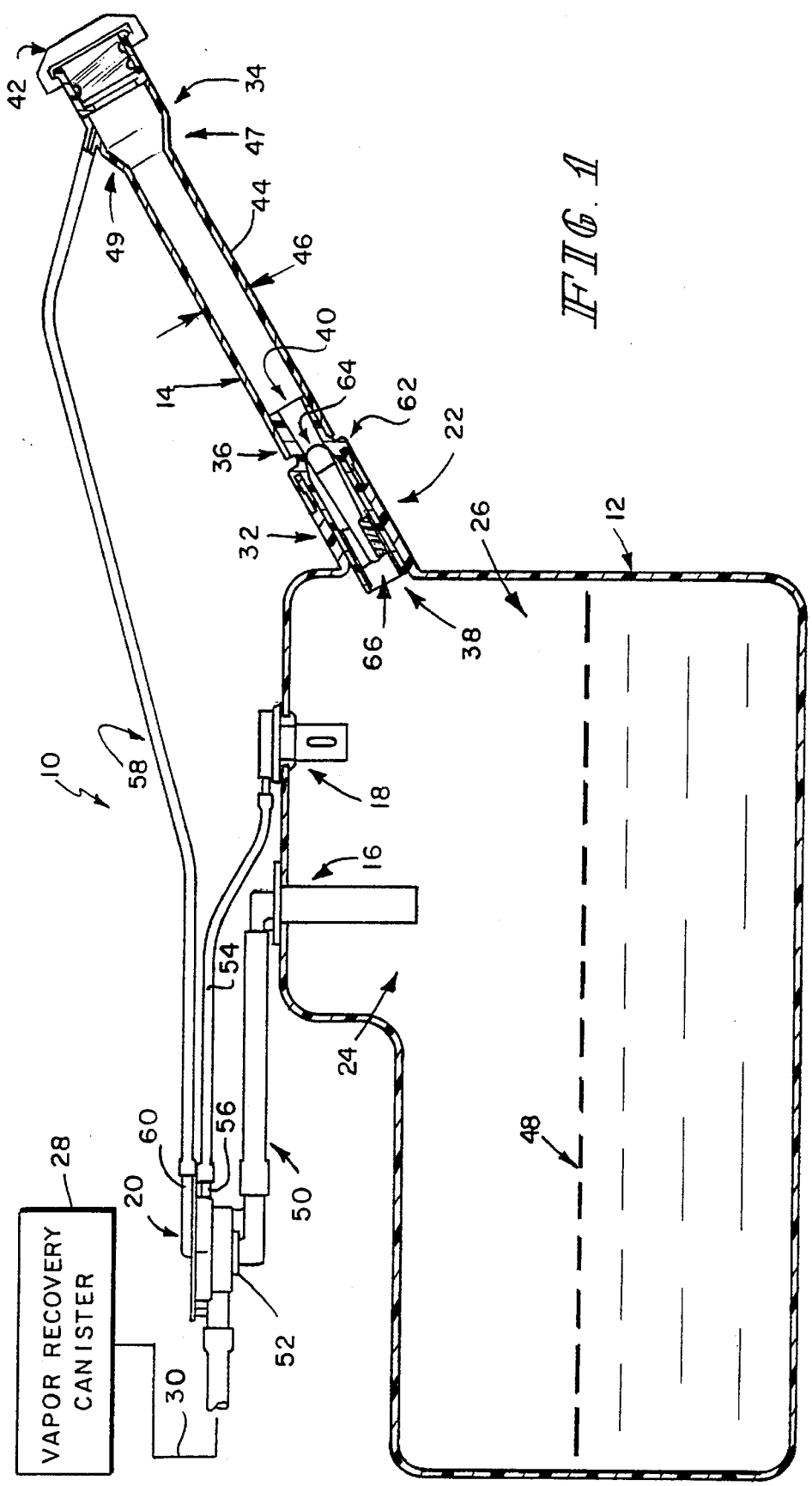
FIG. 1 is a diagrammatic view of a vehicle fuel tank having a small internal diameter filler neck and an Onboard Refueling Vapor Recovery (O.R.V.R.) fuel system including a fuel-delivery control system in accordance with the present invention, the fuel-delivery control system being positioned in the filler neck to regulate flow of liquid fuel and fuel vapor through the filler neck.

A fuel system 10 for use with a vehicle is shown in FIG. 1. Fuel system 10 includes fuel tank 12, filler neck 14, fill-limit valve 16, run-loss valve 18, control valve 20, and fuel-delivery control apparatus 22. Filler neck 14 conducts liquid fuel to fuel tank 12 and inlet check valve assembly 22 regulates flow of liquid fuel and fuel vapor through filler neck 14. Fill-limit valve 16 and the run-loss valve 18 regulate venting of a vapor space 24 in the interior region 26 of fuel tank 12. Control valve 20 functions to control the operation of fill-limit valve 16 and run-loss valve 18. Vented fuel vapor discharged from vapor space 24 of fuel tank 12 through control valve 20 is conducted to a vapor recovery canister 28 or other destination via a discharge conduit 30.

Fuel tank 12 includes an inlet tube 32 in which fuel-delivery control apparatus 22 is mounted as shown in FIG. 1. Filler neck 14 includes a mouth 34 at one end and a discharge outlet 36 at the other end. Fuel-delivery control apparatus 22 has an inner end 38 arranged to extend into interior region 26 of fuel tank 12 and an outer end 40 coupled to discharge outlet 36 of filler neck 14. Mouth 34 is formed to receive a fuel-dispensing pump nozzle (not shown) during refueling and a closure cap 42 at all other times.

Illustratively, the filler neck 14 includes a small-diameter tube 44 made of steel with rubber connections and having an internal diameter 46 of about 0.825 inch (2.10 cm). The discharge outlet 36 is formed in one end of small-diameter tube 44 as shown in FIG. 1. The filler neck 14 further includes a cup 47 having an inlet end configured to receive a pump nozzle (not shown) and a necked-down outlet end 49 attached to an outer end of small-diameter tube 44 as shown in FIG. 1. The outer mouth 34 of filler neck 14 is enlarged in size relative to small-diameter tube 44 to receive a conventional closure cap 42 as shown in FIG. 1.

The vehicle fuel fill tube (filler neck) 44 used with the inlet check valve assembly 22 is located between the cup 47 and the inlet check valve assembly 22 at the tank inlet 32. Conventional filler tubes are typically of relatively large diameter (approximately 1.5 inches (38 mm)) and fuel enters the tank at a velocity directly related to the height of the fuel cap adapter above the fuel level in the tank. Vapor exiting the tank cannot pass through a restriction greater than the pressure drop corresponding to the height of the filler neck inlet. This "fill pressure" available limits the design of Onboard Refueling Vapor Recovery systems since components must be sized for minimum vapor flow restriction to permit high fill rates.

If the cap adapter is shaped to act as a very efficient funnel, the filler tube 44 can be substantially downsized to have an internal diameter 46 of 1.00 inch (25.4 mm) or 0.825 inch (21.0 mm). When fuel is introduced smoothly into the downsized tube 44 by the funnel-shaped inlet 49, the velocity of the dispenser nozzle is maintained, preventing any vapor from flowing back up the tube 44 and maintaining a "liquid seal" against vapor loss to atmosphere. The high velocity also minimizes turbulence around the check valve assembly 22. As the fuel enters the tank 12, the velocity is converted to static pressure, adding to the pressure potential resulting from the filler neck height. This higher total pressure potential allows use of smaller, more flow-restrictive, O.R.V.R. components for lower cost while maintaining desirable high fill rates without flow reversal which results in fill nozzle shutoffs before full fill level is reached.

Fill-limit valve 16 functions to vent pressurized fuel vapor from vapor space 24 in fuel tank 12 during refueling as long as the level of liquid fuel 48 in interior region 26 of fuel tank 12 has not exceeded a predetermined maximum limit. For safety reasons, fuel systems are designed so that the fuel tank is never completely filled with liquid fuel. Rather, at least a predetermined portion of the fuel tank is left for liquid fuel and fuel vapor expansion. Although fuel-dispensing pump nozzles typically include sensors for shutting off the flow of liquid fuel into the fuel tank when the fuel tank is nearly filled, pump nozzle operators may manually override the sensors by continuing to pump fuel after the sensors have automatically shut the pump nozzle off. To assist in preventing tank overfill under such conditions, the fill-limit valve 16 prevents the escape of fuel vapor through the fuel system 10, and thus assists in triggering the pump nozzle shut-off mechanism, when the level of liquid fuel 48 in fuel tank 12 has risen to a predetermined level. Reference is hereby made to Robert S. Harris' U.S. Pat. No. 5,449,029, entitled "Fill Limit Valve Assembly", for a description of a suitable fill-limit valve.

Run-loss valve 18 functions to vent vapor space 24 in fuel tank 12 during operation of a vehicle (not shown) containing the fuel tank 12. Run-loss valve 18 controls fuel vapor loss during vehicle run and is capable of preventing liquid fuel carryover during vehicle rollover. Reference is hereby made to U.S. Pat. No. 5,234,013 to Roetker et al. for a description of a suitable run-loss valve.

Control valve 20 functions to control discharge of fuel vapors from fuel tank 12 to a vapor recovery canister 28. A first vapor inlet passageway 50 conducts tank fuel vapor from fill-limit valve 16 to first input port 52 on control valve 20 and a second vapor inlet passageway 54 conducts tank fuel vapor from run-loss valve 18 to a second input port 56 on control valve 20. A signal passageway 58 extends between the enlarged inlet end 34 of filler neck 14 and a signal port 60 on control valve 20 to conduct fuel vapor from cup 47 in filler neck 14 to assist in actuating control valve 20. Control valve 20 operates to discharge fuel vapor from either first or second vapor inlet passageway 50, 54 to vapor recovery canister 28 through discharge conduit 30. Reference is hereby made to U.S. Pat. No. 5,318,069 to Robert S. Harris for a description of a suitable tank venting and vapor recovery system control valve 20.

Figure 2:
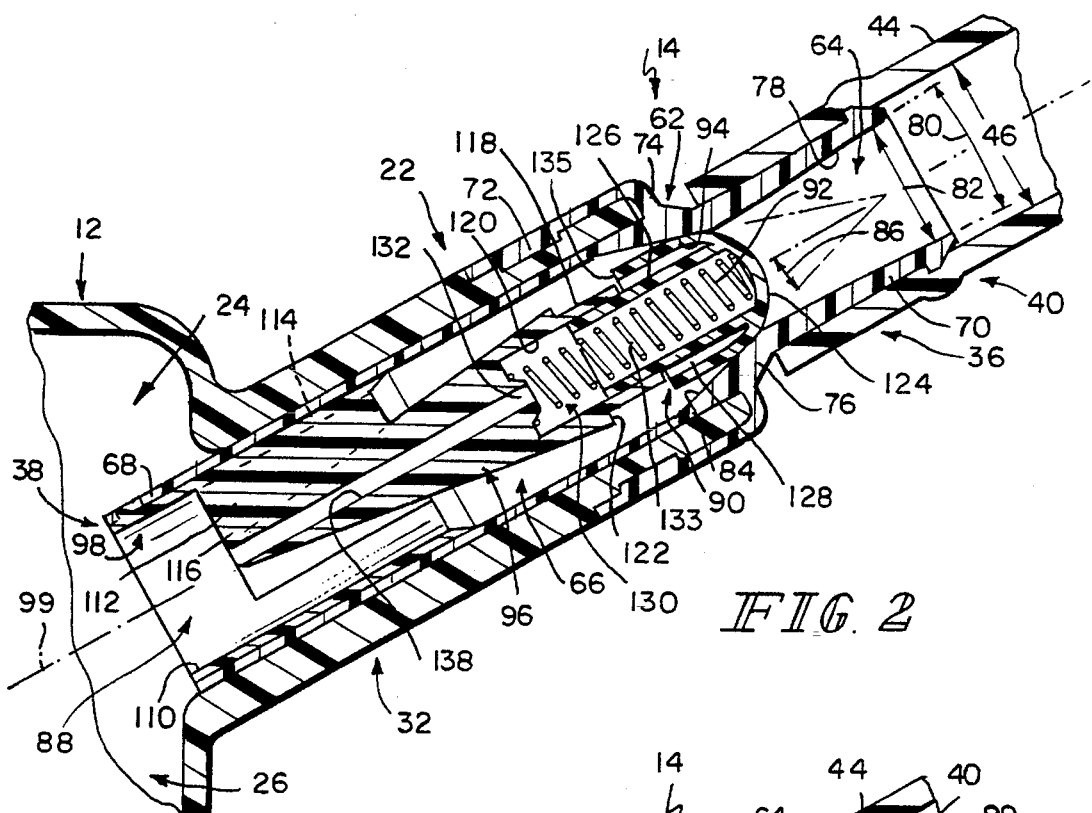
FIG. 2 is a longitudinal sectional view of the fuel-delivery control system of FIG. 1 showing a housing module mounted in a portion of the filler neck adjacent to the fuel tank and formed to include a fuel-delivery channel and a check valve assembly mounted in the fuel-delivery channel and arranged normally in a closed position to block flow of fuel through the fuel-delivery channel.
Figure 3:
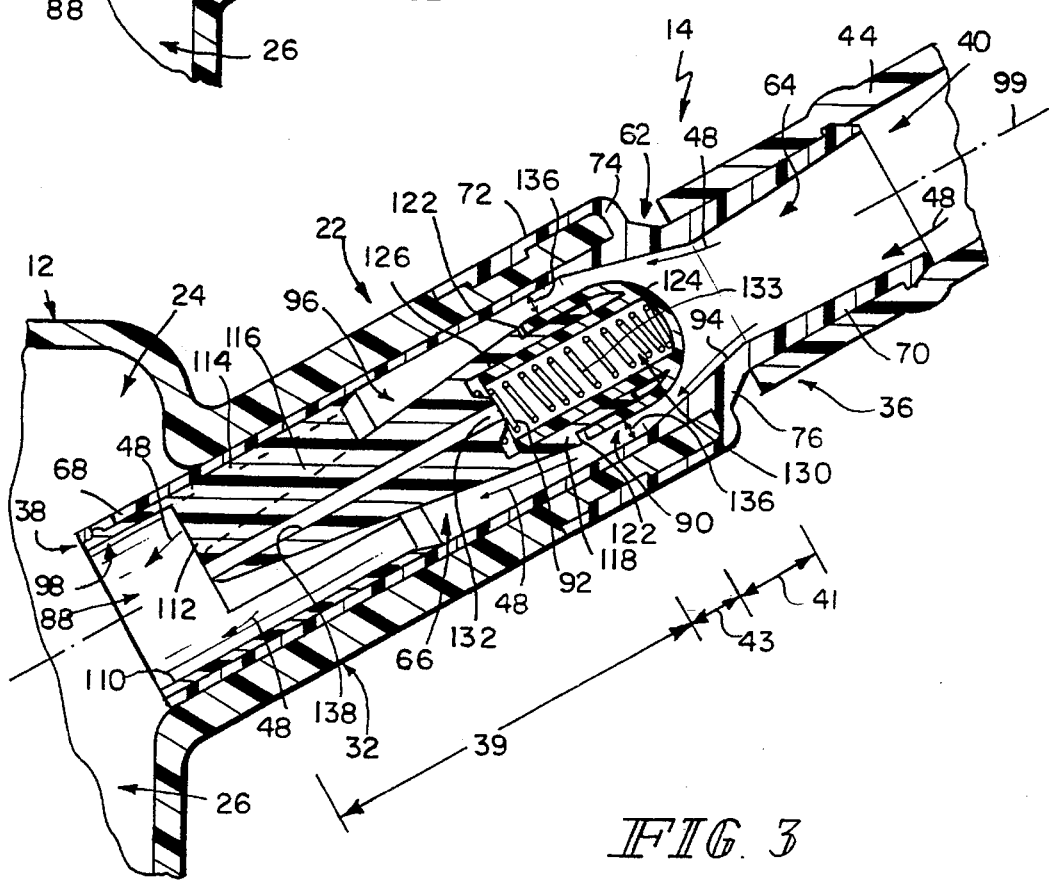
FIG. 3 is a view similar to FIG. 2 showing the check valve assembly of FIG. 2 in its flow-conducting opened position during refueling.

Fuel-delivery control apparatus 22 is shown in greater detail in FIGS. 2 and 3. Apparatus 22 is configured to regulate flow of liquid fuel and fuel vapor between fuel tank 12 and filler neck 14 in the manner described below. Fuel-delivery control apparatus 22 includes a housing module 62 formed to include fuel-delivery channel 64 extending therethrough from inner end 38 to outer end 40. Fuel-delivery control apparatus 22 further includes an inlet check valve assembly 66 positioned to lie in fuel-delivery channel 64 and regulate flow of liquid fuel and fuel vapor therethrough.

Housing module 62 is an elongated sleeve-like element made of plastic material such as acetal. Housing module 62 includes a cylindrical inner tube 68, a cylindrical outer tube 70, and a cylindrical mounting fixture 72 having one end 74 appended to a central junction 76 between the inner and outer tubes 68, 70. The housing module 62 is illustratively installed in fuel tank inlet tube 32 as shown in FIG. 2 so that inner tube 68 extends through fuel tank inlet tube 32, mounting fixture 72 engages and surrounds an outermost end of fuel tank inlet tube, and outer tube 70 lies outside of fuel tank inlet tube 32 and connects to the discharge outlet 36 of filler neck 14.

As shown in FIG. 2, the outer tube 70 has a conical interior wall 78 defining a narrow throat entry angle 80 of about 7°. Preferably, outer tube 70 is configured so that this narrow throat entry angle 80 lies in a range of 0° to 25°. Illustratively, the inlet aperture 82 of outer tube 70 has an internal diameter that is nearly equivalent to the internal diameter 46 of the small-diameter tube 44. Junction 76 defines a "throat" section of housing module 62 and includes another conical interior wall 84 defining a narrow throat exit angle 86 of about 15°. Preferably, the throat exit angle 86 lies in a range of 10° to 25°.

Inlet check valve assembly 66 includes a support base 88 attached to housing module 62, a valve member 90 mounted for sliding movement on the support base 88, and a spring 92 arranged to act against support base 88 and yieldably urge valve member 90 into engagement with a circular valve seat 94 defined by conical interior wall 84 inside housing module 62. Inlet check valve assembly 66 is positioned to lie in the fuel-delivery channel 64 formed in housing module 62 as shown in FIG. 2. Illustratively, valve member 90 is slidable between a channel-closing position shown in FIG. 2 and a channel-opening position shown in FIG. 3.

Support base 88 includes an elongated tail 96 and a mounting fixture 98 for supporting the elongated tail 96 in a position extending through fuel-delivery channel 64 and along the longitudinal axis 99 of housing module 62 as shown in FIGS. 2 and 3. Mounting fixture 98 includes a mounting sleeve 110 for snap-fitting into the inner end 38 of housing module inner tube 68 as shown in FIG. 2. Mounting fixture 98 also includes a thin, trapezoidally shaped, radially extending support flange 112 having one longitudinally extending edge 114 appended to an interior wall of mounting sleeve 110 and another longitudinally extending edge 116 appended to an exterior surface of elongated tail 96. The mounting fixture 98 functions to mount support base 88 in a rigid fixed position in fuel-delivery channel 64 without disrupting or otherwise increasing turbulence of liquid fuel flow through fuel-delivery channel 64.

Support base 88 further includes a guide sleeve 118 appended to tail 96 and configured to receive a portion of valve member 90 and spring 92 therein as shown, for example, in FIG. 2. Illustratively, guide sleeve 118 is formed to include an axially extending passage as shown in FIG. 2. Support base 88 also includes an annular ring-shaped stop flange 122 extending around the circumference of tail 96 and facing toward annular valve seat 94 formed in housing module 62.

Illustratively, tail 96 has a somewhat conical shape. As shown in FIG. 2, tail 96 has a broad end facing toward annular valve seat 94, a distal tip lying near fuel tank 12, and a conically shaped exterior side wall converging from the broad end to the distal tip. Guide sleeve 118 is appended to the broadest end of tail 96.

Valve member 90 is movable between a channel-closing position shown in FIG. 2 and a channel-opening position shown in FIG. 3. Valve member 90 includes a dome-shaped closure member 124 facing valve seat 94 and a cylindrical tubular guide stem 126 connecting to an interior wall in dome-shaped closure member 124. The tubular guide stem 126 is oriented to extend away from valve seat 94 and into passage 120 formed in guide sleeve 118 as shown, for example, in FIG. 2. The tubular guide stem 126 is arranged to define an annular space 128 inside the interior region of the dome-shaped closure member 124 and around an exterior surface of the tubular guide stem 126. An axially outer portion of cylindrical guide sleeve 118 passes into and out of annular space 128 during reciprocating sliding movement of valve member 90 relative to fixed support base 88 in fuel-delivery channel 64 as shown in FIGS. 2 and 3.

An interior region of tubular guide stem 126 on slidable valve member 90 and an interior region of guide sleeve 118 on fixed support member 88 cooperate to define a closed interior region or chamber 130 of variable size receiving spring 92 therein. An axially outer end of spring 92 abuts an interior wall of dome-shaped closure member 124 and an axially inner end of spring 92 abuts a spring mount 132 formed as a round disk on tail 96 as shown in FIG. 2. Spring 92 also includes a middle segment 133 interconnecting its opposing ends and passing through an internal passageway formed in tubular guide stem 126.

Spring 92 is illustratively a coiled compression spring configured normally and yieldably to urge dome-shaped closure member 124 into engagement with conical valve seat 94 formed in junction 76 of housing module 62 as shown in FIG. 2. Such engagement effectively closes the fuel-delivery channel 64 formed in housing module 62. If one or both of dome-shaped closure member 124 and valve seat 94 are made of a suitable sealing material, then engagement of dome-shaped closure member 124 and valve seat 94 will establish a zero-leak connection inside housing module 62 blocking transmission of any liquid fuel or fuel vapor through fuel-delivery channel 64.

Support base 88 is formed to include an annular, ring-shaped stop flange 122 around an exterior portion of guide sleeve 118 as shown, for example, in FIG. 2. An annular stop face 135 is appended to an axially rearwardly facing edge of dome-shaped closure member 124. Annular stop face 135 is arranged to confront the axially forwardly facing annular stop flange 134 on support base 88 as shown in FIGS. 2 and 3.

In use, spring 92 normally urges movable valve member 90 in an axially outward direction in fuel-delivery channel 64 along axis 99 away from fixed support base 88 so that dome-shaped closure member 124 engages conical valve seat 94 to close fuel-delivery channel 64 as shown in FIG. 2. During tank refueling, liquid fuel 48 discharged into filler neck 14 by the fuel-dispensing pump nozzle (not shown) passes into outer end 40 of fuel-delivery channel 64, strikes dome-shaped closure member 124, and moves dome-shaped closure member 124 in an axially inward direction against spring 92 along axis 99 to a retracted position disengaging conical valve seat 94 as shown in FIG. 3. Now liquid fuel 48 is free to pass along and around an exterior surface of dome-shaped closure member 124 and through a flow annulus 136 defined between an interior wall of housing module 62 and an exterior surface of dome-shaped closure member 124 as shown in FIG. 3.

Illustratively, components in fuel-delivery control apparatus 22 are sized and shaped so that the effective "opening" area provided by flow annulus 136 is about 110% to 115% of the effective opening area provided by inlet aperture 82 at the outer end 40 of housing module 62. This small increase in the effective opening area between the inlet to fuel-delivery channel 64 and a maximum external diameter of support base 88 and valve member 90 functions to minimize turbulence of liquid fuel 48 passing around support base 88 and valve member 90 through fuel-delivery channel 64 on its way from filler neck 14 into fuel tank 12. Minimizing liquid fuel turbulence during refueling helps to retard creation of fuel vapor during refueling which can advantageously prevent premature pump nozzle shutoff and development of unwanted fuel system back pressure.

Illustratively, the inlet check valve assembly 66 has a somewhat "torpedo-like" shape as shown in FIGS. 2 and 3. In the embodiment shown in FIGS. 2 and 3, the transverse cross-sectional area of flow annulus 136 is 0.562 square inches (3.625 square centimeters) and the internal diameter of inlet aperture 82 is 0.535 square inch (3.45 square centimeters). Thus, in a preferred embodiment, the effective size of flow annulus 136 is about five percent greater than inlet aperture 82. The torpedo (e.g., valve member 90 and support base 88) collapses within its own length to provide the passage opening through flow annulus 136. Therefore, if inlet check valve assembly 66 is partially submerged in liquid fuel 48 when it is desired to open flow annulus 136, no existing liquid fuel 48 must be displaced to allow valve member 90 to move to the opened position shown in FIG. 3.

Air or fuel vapor within the interior of the torpedo-like inlet check valve assembly 66 when the assembly 66 is in its closed position shown in FIG. 2 is vented out through a single vent aperture 138 formed in support base 88 to facilitate movement of valve member 90 to the retracted position shown in FIG. 3. Although this vent aperture 138 could be located in a wide variety of locations, such aperture 138 preferably extends along central axis 99 as shown in FIGS. 2 and 3. When back pressure is created in fuel tank 12 by closure or restriction of a vapor flow path, this pressure reacts through the vent aperture 138 formed in tail 96 to assist spring 92 in moving the valve member 90 to its closed position shown in FIG. 2. If this feature is not desired, the vent can be a series of radial holes in the diffuser section 139 of check valve assembly 66 defined by tail 96, which is a low-pressure area while flow is occurring and little affected by pressure in the fuel tank 12.

Advantageously, the fuel-delivery control apparatus 22 is a collapsible, tubular member that fits easily in a fuel tank filler neck and contracts within its own length to open, thereby displacing only the liquid fuel necessary to allow air or fuel vapor escape from within variable size chamber 130 formed in torpedo 88, 90 through the vent aperture 138 formed in a downstream portion of fixed tail 96 or through other side vents. The result is a positive, spring-closed valve whose opening resistance does not vary greatly in fuel vapor versus in liquid fuel.

Referring to FIG. 3, fuel-delivery control apparatus 22 includes an axially extending flow direction change area 41 near the outer end 40 of housing module 62, an axially extending constant cross-section flow area 43 defined by flow annulus 136, and the axially extending diffuser area 39. As described previously, the flow area for liquid fuel 48 increases slightly from the axially outer end of flow direction change area 41 to the axially inner end of flow direction change area 41. Such fuel flow stabilizes in constant cross-section flow area 43 due to the constant cross section in flow annulus 136.

Figure 4:
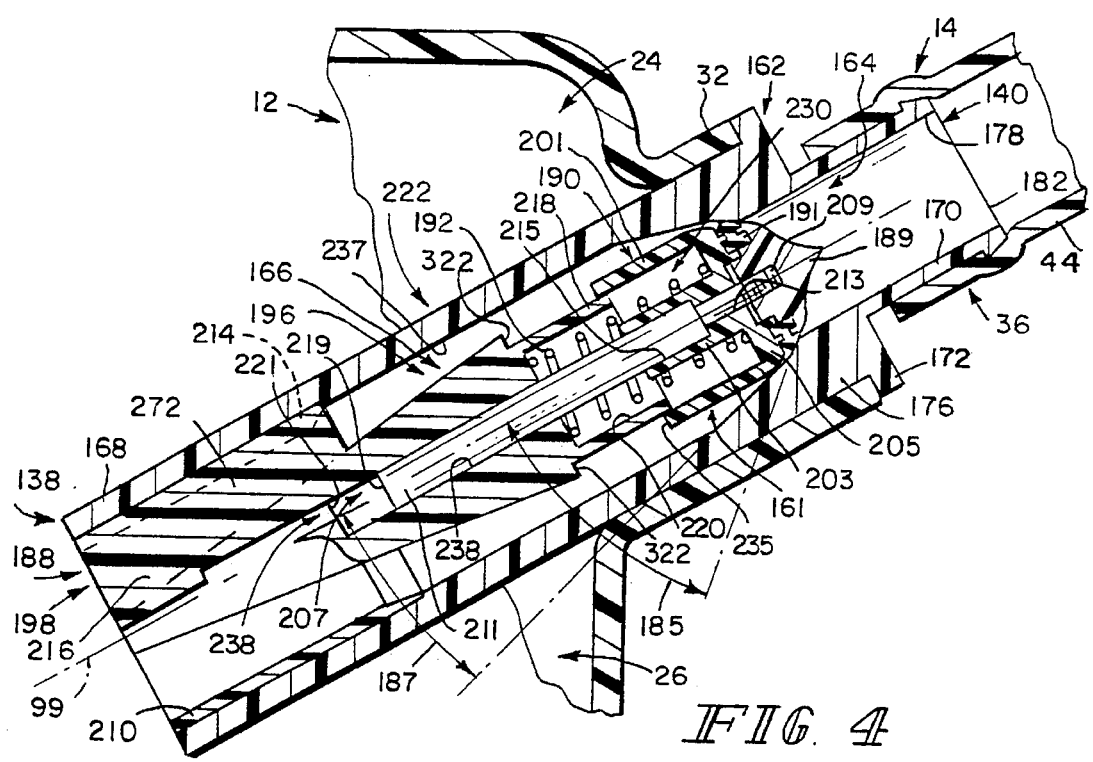
FIG. 4 is a longitudinal sectional view of a fuel-delivery control system in accordance with a second embodiment of the invention showing a check valve assembly carrying an annular seal member and lying in a closed position to lock flow of fuel through a fuel-delivery channel provided in a housing module mounted in a fuel tank inlet.
Figure 5:
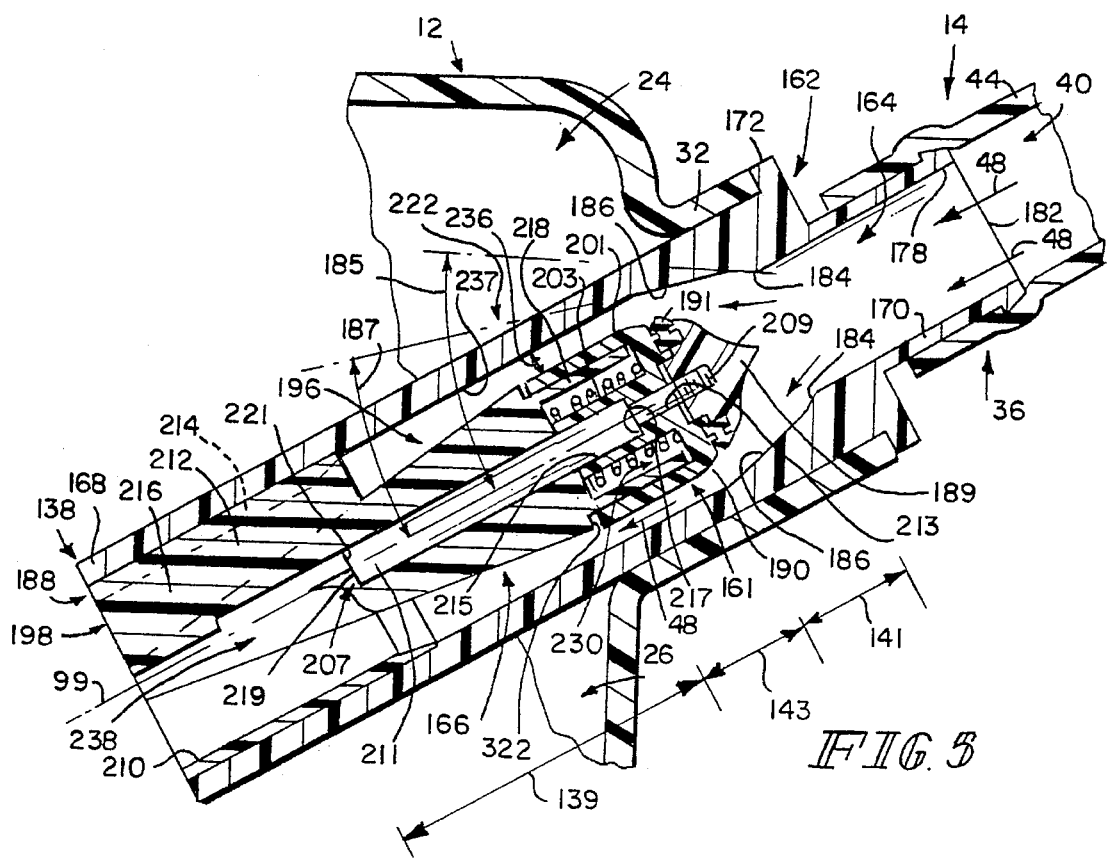
FIG. 5 is a view similar to FIG. 4 showing the check valve assembly of FIG. 4 in its flow-conducting opened position during refueling.

A second embodiment of a fuel-delivery control apparatus in accordance with the present invention is shown in FIGS. 4 and 5. Elements in FIGS. 4 and 5 having reference numbers used in FIGS. 1–3 perform the same or similar functions as they perform in connection with the embodiment of FIGS. 1–3. In this second embodiment, an annular elastomeric seal (e.g., seal member 191) is added to the valve member to establish a positive seal when the fuel delivery control apparatus 122 is closed.

Fuel-delivery control apparatus 222 is shown in greater detail in FIGS. 4 and 5. Apparatus 222 is configured to regulate flow of liquid fuel and fuel vapor between fuel tank 12 and filler neck 14. Fuel-delivery control apparatus 222 includes a housing module 162 formed to include fuel-delivery channel 164 extending therethrough from axially inner end 138 to axially outer end 140. Fuel-delivery control apparatus 222 further includes an inlet check valve assembly 166 positioned to lie in fuel-delivery channel 164 and regulate flow of liquid fuel and fuel vapor therethrough.

Housing module 162 is an elongated sleeve-like element made of plastic material such as acetal. Housing module 162 includes a cylindrical inner tube 168, a cylindrical outer tube 170, and an annular mounting flange 172 between tubes 168 and 170. The housing module 162 is illustratively installed in fuel tank inlet tube 32 as shown in FIG. 4 so that inner tube 168 extends through fuel tank inlet tube 32 and into interior region 26 of fuel tank 12, annular mounting flange 172 engages an outermost end of fuel tank inlet tube 32, and outer tube 170 lies outside of fuel tank inlet tube 32 and connects to the discharge outlet 36 of the small-diameter tube 44 defining filler neck 14.

As shown in FIG. 4, the outer tube 170 has a cylindrical interior wall 178. Illustratively, the inlet aperture 182 of outer tube 170 has an internal diameter that is nearly equivalent to the internal diameter 46 of the small-diameter tube 44 and has a transverse cross-sectional area of b 0.545inch (1.38 cm). Junction 176 defines a "throat" section of housing module 162 and, as shown best in FIG. 5, includes a first conical interior wall 184 defining a throat inlet angle 185 of about 35°. Junction 176 also includes a second interior wall 186 defining a throat exit angle 187 of 15°. Preferably, the throat exit angle 187 lies in a range of 10° to 25°.

Inlet check valve assembly 166 includes a support base 188 attached to housing module 162 and a valve member 190 mounted for sliding movement on support base 188. A conical nose portion 189 is mounted on a forward end of a base portion 161 included in valve member 190 and an annular seal member 191 made of an elastomeric sealing material is clamped in a fixed position between base portion 161 and conical nose portion 189 as shown in FIG. 4. A spring 192 is arranged to act against support base 188 and yieldably urge annular seal member 191 into engagement with a circular valve seat defined by first conical interior wall 184 inside housing module 162. Inlet check valve assembly 166 is positioned to lie in the fuel-delivery channel 164 formed in housing module 162 as shown in FIG. 4. Illustratively, valve member 190 includes annular seal member 191 and is slidable between a channel-closing position shown in FIG. 4 and a channel-opening position shown in FIG. 5.

Support base 188 includes an elongated tail 196 and a mounting fixture 198 for supporting elongated tail 196 in a position extending through fuel-delivery channel 164 and along the longitudinal axis 99 of housing module 162 as shown in FIGS. 4 and 5. Mounting fixture 198 includes a mounting sleeve 210 for snap-fitting into the inner end 138 of housing module inner tube 168 as shown in FIG. 4. Mounting fixture 198 also includes a thin, trapezoidally shaped, radially extending support flange 212 having one longitudinally extending edge 214 appended to an interior wall of mounting sleeve 210 and another longitudinally extending edge 216 appended to an exterior surface of elongated tail 196. The mounting fixture 198 functions to mount support base 188 in a rigid fixed position in fuel-delivery channel 164 without disrupting or otherwise increasing turbulence of liquid fuel flow through fuel-delivery channel 164.

Support base 188 further includes a guide sleeve 218 appended to tail 196 and configured to receive a portion of base portion 161 and spring 192 therein as shown, for example, in FIG. 4. Illustratively, guide sleeve 218 is formed to include an axially extending passage 220 as shown in FIG. 4. Support base 188 also includes an annular ring-shaped stop flange 322 extending around the circumference of tail 196 and facing toward annular valve seat 184 formed in housing module 162.

Illustratively, tail 196 has a somewhat conical shape. As shown in FIG. 4, tail 196 has a broad end facing toward annular valve seat 184, a distal tip lying inside fuel tank 12, and a conically shaped exterior side wall converging from the broad end to the distal tip. Guide sleeve 219 is appended to the broadest end of tail 196.

Valve member 190 is movable between a channel-closing position shown in FIG. 2 and a channel-opening position shown in FIG. 3. Base portion 161 of valve member 190 includes a cylindrical outer sleeve 201 around guide sleeve 218 and a cylindrical inner sleeve 203 inside guide sleeve 218. Spring 192 is positioned to lie in an annular space 230 provided between guide sleeve 21 and inner sleeve 203. An inner end of spring 192 engages a wall formed on tail 196 and an outer end of spring 192 engages an annular flange 205 on valve member 190. Annular flange 205 is positioned to interconnect concentric outer and inner sleeves 201, 203 and to abut an axially inwardly facing side of annular seal member 191 as shown best in FIG. 5.

The inner sleeve 203 is oriented to extend away from valve seat 184 and into passage 220 formed in guide sleeve 218 as shown, for example, in FIG. 4. An interior region of cylindrical outer sleeve 201 on slidable base portion 161 and an interior region of guide sleeve 218 on fixed support member 188 cooperate to define a closed interior region or chamber 230 of variable size receiving spring 192 therein.

Spring 192 is illustratively a coiled compression spring configured normally and yieldably to urge valve member 190 in an axially outer direction moving annular seal member 191 into engagement with conical valve seat 184 formed in junction 176 of housing module 162 as shown in FIG. 4. Such engagement effectively closes the fuel-delivery channel 164 formed in housing module 162. Engagement of annular seal member 191 and valve seat 184 will establish a zero-leak connection inside housing module 162 blocking transmission of any liquid fuel or fuel vapor through fuel-delivery channel 164.

Support base 188 is formed to include an annular, ring-shaped stop flange 322 around an exterior portion of guide sleeve 118 as shown, for example, in FIG. 2. An annular stop face 235 is appended to an axially rearwardly facing edge of cylindrical outer guide sleeve 201. Annular stop face 235 is arranged to confront the axially forwardly facing annular stop flange 322 on support base 188 as shown in FIGS. 4 and 5.

In use, spring 192 normally urges movable valve member 190 in an axially outward direction in fuel-delivery channel 164 along axis 99 away from fixed support base 188 so that annular seal member 191 engages conical valve seat 184 to close fuel-delivery channel 164 as shown in FIG. 4. During tank refueling, liquid fuel 48 discharged into filler neck 14 by the fuel-dispensing pump nozzle not shown) passes into outer end 140 of fuel-delivery channel 164 strikes conical-shaped nose member 188, and moves nose member 189 in an axially inward direction against spring 192 along axis 99 to a retracted position disengaging conical valve seat 184 as shown in FIG. 5. Now liquid fuel 48 is free to pass along and around an exterior surface of nose member 184 and through a flow annulus 236 defined between a cylindrical interior wall 237 of housing module 162 and an exterior surface of cylindrical outer sleeve 201 as shown in FIG. 5.

Illustratively, components in fuel-delivery control apparatus 222 are sized and shaped so that the effective "opening" area provided by flow annulus 236 is about 110% to 115% of the effective opening area provided by inlet aperture 182 at the outer end 140 of housing module 162. This small increase in the effective opening area between the inlet to fuel-delivery channel 164 and a maximum external diameter of support base 188 and valve member 190 functions to minimize turbulence of liquid fuel 48 passing around support base 188 and valve member 190 through fuel-delivery channel 164 on its way from filler neck 14 into fuel tank 12. Minimizing liquid fuel turbulence during refueling helps to retard creation of fuel vapor during refueling which can advantageously preen premature pump nozzle shutoff and development of unwanted fuel system back pressure.

Illustratively, the inlet check valve assembly 166 has a somewhat "torpedo-like" shape as shown in FIGS. 4 and 5. In the embodiment shown in FIGS. 4 and 5, the transverse cross-sectional area of flow annulus 236 is 0.754 square inch (4.63 square centimeters) and the internal diameter of inlet aperture 182 is 0.684 square inch (4.41 square centimeters). The torpedo (e.g., valve member 190 and support base 188) collapses within its own length to provide the passage opening through flow annulus 236. Therefore, if inlet check valve assembly 166 is partially submerged in liquid fuel 48 when it is desired to open flow annulus 236, no existing liquid fuel 48 must be displaced to allow valve member 190 to move to the opened position shown in FIG. 5.

Air or fuel vapor within the interior of the torpedo-like inlet check valve assembly 166 when the assembly 166 is in its closed position shown in FIG. 4 is vented out through a single vent aperture 238 formed in support base 88 and extending along longitudinal axis 99 to facilitate movement of valve member 190 to the retracted position shown in FIG. 5. When back pressure is created in fuel tank 12 by closure or restriction of a vapor flow path, this pressure reacts through the vent aperture 238 formed in tail 196 to assist spring 192 in moving the valve member 190 to its closed position shown in FIG. 4. If this feature is not desired, the vent can be a series of radial holes in the diffuser section 139 of the tail 196, which is a low-pressure area while flow is occurring and little affected by pressure in the fuel tank 12.

A bolt 207 is provided to anchor conical nose portion 189 to base portion 161 so as to trap annular seal member 191 therebetween as shown in FIGS. 4 and 5. Bolt 207 includes a threaded portion 209 engaging nose portion 189 and a head portion 211 engaging tail 196 and base portion 161. As shown in FIG. 4, base portion 161 is formed to include an outer passage 213 receiving threaded portion 209 of bolt 207 and a larger diameter inner passage 215 receiving a part of head portion 211. Illustratively, annular flange 205 and inner sleeve 203 are formed to provide outer passage 213 and inner sleeve 203 is formed to provide inner passage 215. An axially inwardly facing annular flange 217 is formed at the junction between outer and inner passages 213,215 as shown in FIG. 4 to receive bolt head portion 211 and cause annular seal member 191 to be trapped between base portion 161 and conical nose portion 189.

As shown in FIGS. 4 and 5, bolt head portion 211 is quite long and is sized to slide back and forth in exhaust passage 238 formed in tail 196 during movement of valve member 190 between its opened and closed positions. The outer diameter of bolt head portion 211 is sized relative to the inner diameter of vent passage 238 to provide a clearance path therebetween through which air and fuel vapor can flow to facilitate (1) venting of chamber 230 during opening of inlet check valve assembly 166 and (2) pressurizing of chamber 230 at appropriate times when inlet check valve assembly 166 is closed.

Although annular flange 322 on tail 196 can be engaged by annular flange 236 on base portion 161 of valve member 190 to block axially inward movement of valve member 190 away from circular valve seat 184 formed in housing module 162, the innermost end 219 can engage an axially outwardly facing flange 221 in vent passageway 238 to block movement of bolt 207, base portion 161, annular seal member 191, and nose portion 189 away from circular valve seat 184. Space between bolt end 219 and tail flange 221 is shown in FIG. 4. Engagement of bolt end 219 and tail flange 221 is shown in FIG. 5.

Referring to FIG. 5, fuel-delivery control apparatus 222 includes an axially extending flow direction change area 141 near outer end 150 of housing module 162, an axially extending constant cross-section flow area 143 defined by flow annulus 236, and an axially extending diffuser area 239. As was the case in the embodiment of FIGS. 1–3, the flow area for liquid fuel 48 increases slightly from the axially outer end of the flow direction change area 141 to the axially inner end of flow direction change area 141. Such fuel flow stabilizes in constant cross-section flow area 43 due to the constant cross section in flow annulus 236.

Figure 6:
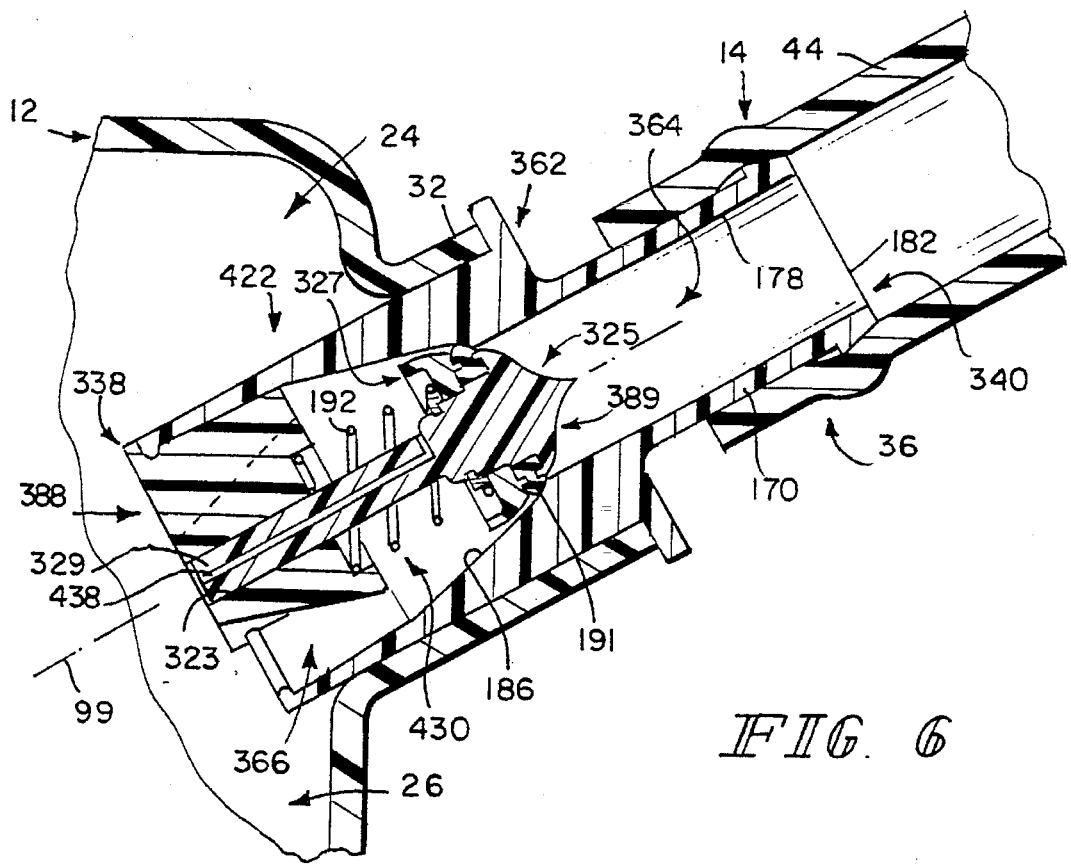
FIG. 6 is a longitudinal sectional view of a fuel-delivery control system in accordance with a third embodiment of the invention showing a short check valve assembly carrying an annular seal member and lying in a closed position to block flow of fuel through a fuel-delivery channel provided in a housing module mounted in a fuel tank inlet.
Figure 7:
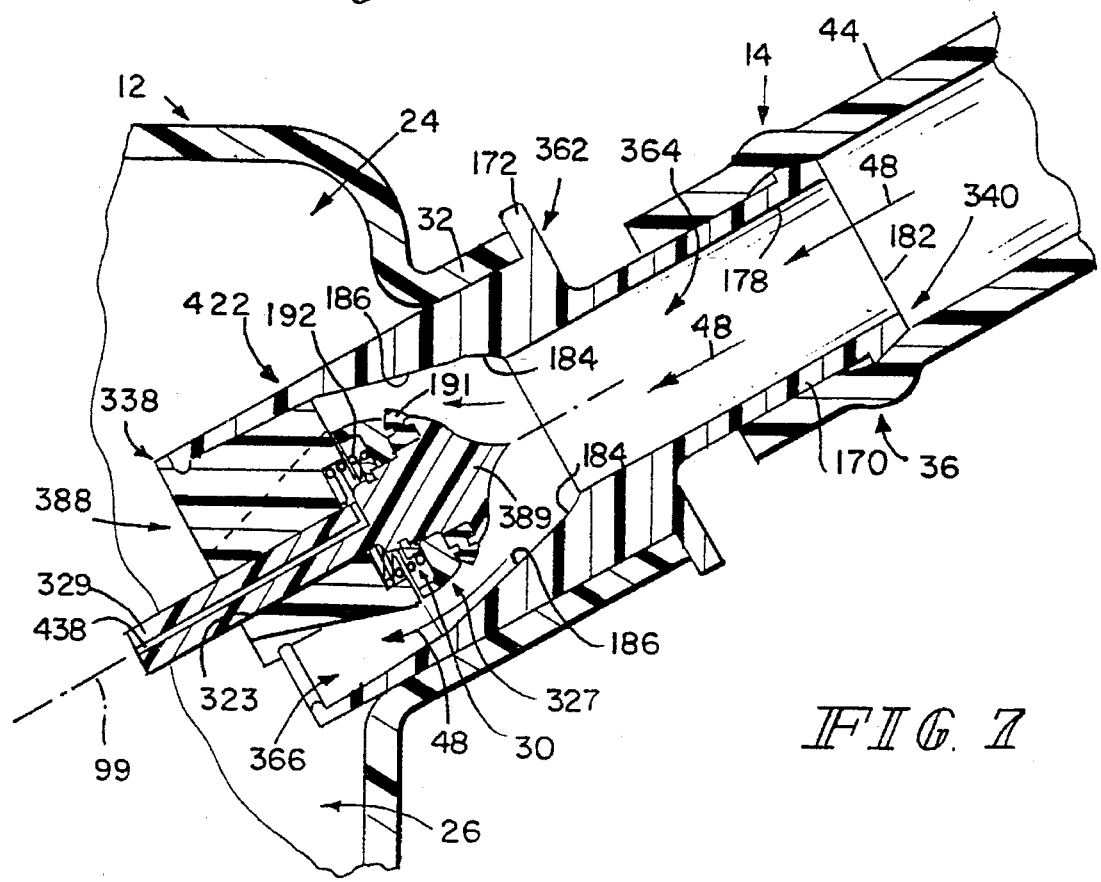
FIG. 7 is a view similar to FIG. 6 showing the check valve assembly of FIG. 6 in its flow-conducting opened position during refueling.

A third embodiment of a fuel-delivery control apparatus in accordance with the present invention is shown in FIGS. 6 and 7. Elements in FIGS. 6 and 7 having reference numbers used in FIGS. 1–3 or 4–5 perform the same or similar functions as they perform in connection with the embodiments of FIGS. 1–3 or 4–5. In this third embodiment, a compact fuel-delivery control apparatus is provided for regulating flow of liquid fuel and fuel vapor through a fuel tank inlet.

Fuel-delivery control apparatus 422 is shown in greater detail in FIGS. 6 and 7. Apparatus 422 includes a housing module 362 that fits in tank inlet 32 and an inlet check valve assembly 366 that regulates flow of liquid fuel and fuel vapor between filler neck 14 and fuel tank 12. Housing module 362 is formed to include a fuel-delivery channel 364 extending from axially inner end 338 to axially outer end 340.

Inlet check valve assembly 366 includes a support base 388 attached to housing module 362 and formed to include a guide channel 323, a slide member 325, an annular seal member 191, an annular clamp member 327, and a spring 192. Slide member 325 includes a somewhat conical nose portion 389 facing toward the axially outer end 340 of housing module 362 and an axially inwardly extending sliding guide stem 329 extending into the guide channel 323 formed in support base 388. Annular clamp member 327 is mounted on slide member 325 to clamp annular seal member 191 in the position shown in FIGS. 6 and 7.

Spring 192 is mounted normally to urge slide member 325 to the flow-blocking position shown in FIG. 6 wherein annular seal member 191 sealingly engages valve seat 184. Spring 192 includes an outer end engaging an inner face of annular clamp member 327 and an inner end placed in a shallow receptacle formed in support base 388. During refueling, liquid fuel 48 admitted into housing module 162 through filler neck 14 strikes nose portion 389 and urges slide member 325 inwardly to compress spring 192 as shown in FIG. 7. Once refueling is complete, spring 192 functions to restore slide member 325 to its flow-blocking position shown in FIG. 6.

A vent passage 438 is formed in sliding guide stem 329 as shown in FIGS. 6 and 7. Vent passage 438 helps to vent fuel vapor extant in space 430 between support base 388 and clamp member 327 during refueling as shown in FIG. 7. Also, vapor pressure in tank 12 can reach space 430 at other times to help spring 192 urge slide member 325 to its flow-blocking position.

Although the invention has been described and defined in detail with reference to certain preferred embodiments, variations and modifications exist within the scope and spirit of the invention as described and defined in the following claims.

I claim:

1. A fuel-delivery control system for a fuel tank, the system comprising
   a housing module formed to include a fuel-delivery channel, and
   a check valve assembly positioned to lie in the fuel-delivery channel, the check valve assembly including a support base appended to the housing module and formed to include a guide passageway, a valve member including a guide stem extending into the guide passageway for axial movement therein along a longitudinal axis and a closure member appended to the guide stem for axial movement with the guide stem along the longitudinal axis between a channel-closing position engaging the housing module and a channel-opening position disengaging the housing module, said guide stem moving in said guide passageway as said closure member moves between said channel-opening position and channel-closing positions, and a spring yieldably urging the valve member toward its channel-closing position, the support base including a spring mount engaging one end of the spring and a stop flange, the valve member further including means for engaging the stop flange to limit axial movement of the valve member relative to the support base in a channel-opening direction.

2. The system of claim 1, wherein the stop flange is positioned to lie in axially spaced-apart relation to the spring mount and lie in radially spaced-apart relation to the guide passageway.

3. The system of claim 1, wherein the support base includes a guide sleeve formed to include a spring passageway receiving the spring and terminating at the spring mount.

4. The system of claim 3, wherein the hub includes an outer face arranged to face toward the closure member and formed to include a first opening into the guide passageway and an inner face arranged to face in an opposite direction away from the closure member and formed to include a second opening into the guide passageway.

5. The system of claim 4, wherein the exterior side wall of the tail is conically shaded.

6. The system of claim 4, the support base includes a hub formed to include the guide passageway receiving the guide stem and a guide sleeve connecting to the hub and receiving the spring therein.

7. The system of claim 2, wherein the stop flange is a ring-shaped member and surrounds the guide passageway and the guide stem received therein.

8. The system of claim 2, wherein the spring mount is a round disk.

9. The system of claim 2, wherein the stop flange is a ring-shaped member formed to include a central aperture and the spring passes through the central aperture.

10. The system of claim 3, wherein the stop flange is appended to an exterior surface of the guide sleeve.

11. The system of claim 3, wherein the guide stem passes through the spring passageway formed in the guide sleeve and a stop face is appended to the closure member and arranged to confront the stop flange on the support base.

12. The system of claim 11, wherein the stop flange is a first ring-shaped member appended to an exterior surface of the guide sleeve and the stop face is a second ring-shaped member formed to include a central aperture receiving the guide sleeve therein and sized to mate with the first ring-shaped member.

13. The system of claim 1, wherein the valve member further includes a stop face appended to the closure member and arranged to confront the stop flange on the support base.

14. The system of claim 1, wherein the spring defines a passageway extending along the longitudinal axis and the guide stem passes through the passageway defined by the spring.

15. The system of claim 14, wherein the closure member includes a wall facing toward the guide channel formed in the support base, the guide stem includes one end appended to the wall and another end inserted into the guide channel, and the spring engages the wall.

16. The system of claim 14, wherein the check valve assembly is tear-drop shaped and the support base is conically shaped.

17. The system of claim 6, wherein the mounting fixture is appended to the hub.

18. A fuel-delivery control system for a fuel tank, the system comprising
   a housing module formed to include a fuel-delivery channel, and
   a check valve assembly positioned to lie in the fuel-delivery channel, the check valve assembly including a support base formed to include a guide passageway, a mounting fixture inserted into the fuel-delivery channel and arranged to interconnect the housing module and the support base, a valve member including a guide stem extending into the guide passageway for movement therein and a closure member appended to the guide stem for movement with the guide stem between a channel-closing position engaging the housing module and a channel-opening position disengaging the housing module, said guide stem moving in said guide passageway as said closure member moves between said channel-opening position and channel-closing position, and a spring yieldably urging the valve member to its channel-closing position.

19. The system of claim 18, wherein the housing module has an interior wall defining the fuel-delivery channel and the mounting fixture includes a flat plate having one edge integrally appended to the support base.

20. The system of claim 18, wherein the housing module includes a valve seat in the fuel-delivery channel, the closure member faces toward the valve seat, and the guide stem extends away from the valve seat.

21. The system of claim 18, wherein the closure member is a dome-shaped element having an external surface normally engaging an interior wall of the housing module upon movement of the closure member to the channel-closing position to block flow of fuel vapor and liquid fuel through the fuel-delivery channel and an opposite internal surface and the guide stem is a cylindrical tube having one end appended to the internal surface and another end extending into and slidably engaging the guide passageway.

22. The system of claim 17, wherein the housing module has an interior wall defining the fluid-delivery channel and the mounting fixture includes a flat plate having one edge integrally appended to the hub and another edge abutting the interior wall of the housing module.

23. The system of claim 6, wherein the stop flange surrounds a portion of the spring received in the guide sleeve.

24. The system of claim 19, wherein the flat plate has a trapezoidal shape.

25. The system of claim 19, wherein the housing module includes a longitudinal axis extending through the fuel-delivery channel and the flat plate is oriented to extend along the longitudinal axis.

26. The system of claim 19, wherein the support base includes a tail having an exterior side wall and the flat plate is connected to the exterior side wall.

27. The system of claim 21, wherein the guide stem is formed to include a first spring-receiving channel therein, the support base includes a guide sleeve formed to include a second spring-receiving channel therein, and the spring has one end lying in the first spring-receiving channel formed in the guide stem and another end lying in the second spring-receiving channel and engaging a spring mount formed on the support base.

28. The system of claim 6, wherein the stop face surrounds a portion of the guide stem.

29. The system of claim 18, wherein the spring has one end engaging the support base and another end engaging the closure member and the spring is formed to include a passageway extending therethrough and receiving the guide stem therein.

30. The system of claim 6, wherein the hub includes a stop flange and the closure member includes a stop face arranged to confront the stop flange on the hub.

\* \* \* \* \*

UNITED STATES PATENT AND TRADEMARK OFFICE
CERTIFICATE OF CORRECTION

PATENT NO. : 5,568,828        Page 1 of 3
DATED : October 29, 1996
INVENTOR(S) : Robert S. Harris It is certified that error appears in the above-indentified patent and that said Letters Patent is hereby corrected as shown below:

Column 13, line 22 (claim 1), change "positions" to --position--.

Column 13, line 38 (claim 4), change "of claim 3" to --of claim 31--.

Column 13, line 44 (claim 5), change "of claim 4" to --of claim 26--.

Column 13, line 45 (claim 5), change "shaded" to --shaped--.

Column 13, line 46 (claim 6), change "of claim 4" to --of claim 18--.

Column 14, line 14 (claim 16), change "of claim 14" to --of claim 18--.

Column 14, line 61 (claim 23), change "of claim 6" to --of claim 30--.

Column 16, line 1 (claim 28), change "of claim 6" to --of claim 30--.

UNITED STATES PATENT AND TRADEMARK OFFICE
CERTIFICATE OF CORRECTION

PATENT NO. : 5,568,828
DATED : October 29, 1996
INVENTOR(S) : Robert S. Harris

It is certified that error appears in the above-indentified patent and that said Letters Patent is hereby corrected as shown below:

Column 16, after claim 30, insert claims 31-34 as follows:

31. The system of claim 1, wherein the support base includes a hub formed to include the guide passageway and a radially extending support flange interconnecting the hub and the housing module to support the hub in a fixed position in the fuel-delivery channel formed in the housing module.

32. The system of claim 31, wherein the radially extending support flange is a flat plate.

33. The system of claim 32, wherein the flat plate is oriented to extend along the longitudinal axis.

UNITED STATES PATENT AND TRADEMARK OFFICE
CERTIFICATE OF CORRECTION

PATENT NO. : 5,568,828
DATED : October 29, 1996
INVENTOR(S) : Robert S. Harris

It is certified that error appears in the above-indentified patent and that said Letters Patent is hereby corrected as shown below:

34. The system of claim 31, wherein the housing module includes a longitudinally extending inner wall forming a boundary of the fuel-delivery channel and the radially extending support flange includes a radially inner edge integrally appended to the hub and a radially outer edge abutting the longitudinally extending inner wall of the housing module.

Signed and Sealed this

Eighteenth Day of August, 1998

*Attest:*

BRUCE LEHMAN

*Attesting Officer*      *Commissioner of Patents and Trademarks*